Sept. 2, 1924.
W. M. ZORN
1,507,410
METHOD OF MAKING CONCENTRATED COFFEE LIQUIDS CONTAINING OILS
Filed July 10, 1924
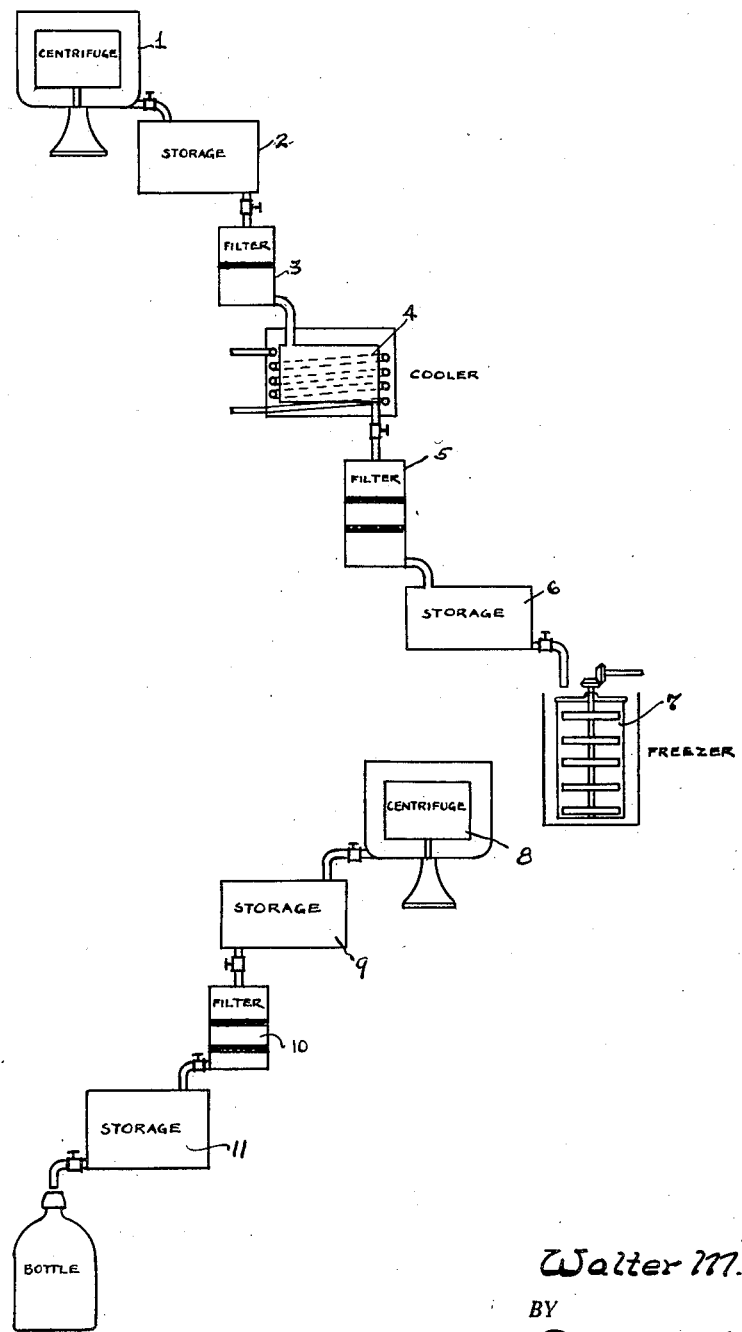
INVENTOR.
Walter M. Zorn
BY
Fay, Oberlin & Fay
ATTORNEYS Patented Sept. 2, 1924.

1,507,410

UNITED STATES PATENT OFFICE.

WALTER M. ZORN, OF EAST CLEVELAND, OHIO.

METHOD OF MAKING CONCENTRATED COFFEE LIQUIDS CONTAINING OILS.

Application filed July 10, 1924. Serial No. 725,128.

*To all whom it may concern:*

Be it known that I, WALTER M. ZORN, a citizen of the United States, and a resident of East Cleveland, county of Cuyahoga and State of Ohio, have invented a new and useful Improvement in Methods of Making Concentrated Coffee Liquids Containing Oils, of which the following is a specification, the principle of the invention being herein explained, and the best mode in which I have contemplated applying that principle so as to distinguish it from other inventions.

The present invention relates to a method of making a concentrated solution of coffee suitable for use as cup coffee when diluted and suitable in its concentrated condition for flavoring and the like. In preparing a concentrated coffee solution, it has been found that to obtain a concentrate which will keep indefinitely, it is necessary to eliminate as much of the water content as possible from the finished product.

The present method consists of forming an infusion of coffee, preferably by a centrifugal machine, and then so treating the infused liquid as to eliminate therefrom the undesirable elements which upon standing causes the chemical or other changes which break down the flavor or otherwise cause the liquid to spoil.

To remove the undesirable elements, it is necessary to filter the infusion or to concentrate the solution and then filter the same. It is preferable, however, to filter the solution while it is hot and substantially as it comes from the infusing machine, then to cool the filtered liquid and to refilter the same to remove such other materials as may be thrown into suspension by the cooling of the liquid. This filter liquid is then frozen into a mushy state so as to freeze the water into the form of snow or ice crystals which are removed from the frozen mass so as to leave the concentrated coffee solution containing oils.

This freezing and concentrating is continued until the desired degree of concentration is obtained and the resultant concentrated solution of coffee containing oils is bottled and ready for use by dilution. After the solution has been concentrated to the desired point, it is subjected to a final filtering and is then bottled and sealed and subjected to a sterilizing temperature but a temperature less than the boiling point of water.

The annexed drawing and the following description set forth in detail one approved method of carrying out the invention, such disclosed mode, however, constituting but one of the various ways in which the principle of the invention may be used.

The drawing is a diagrammatic layout of apparatus suitable for carrying out the described process.

In the present process the coffee flour is first infused preferably in a centrifugal machine 1 such as is shown and described in my co-pending application, Ser. No. 330,847, filed October 15, 1919. The infused liquid from the centrifuge is conducted to a storage tank 2 from which it is drawn into a filter 3 where the suspended matter is filtered out and the filtered liquid is next passed through a cooling coil or tank 4 and the temperature reduced as low as possible without freezing. The liquid is then filtered again through a second filter 5 while in this cold state to remove such other matter as is reduced to suspension by cooling the liquid and is then run into a storage tank or receptacle 6.

The double filtered infusion is drawn into a freezing chamber or vessel 7 where it is frozen in much the same manner as in making water ices or sherbet. While the freezing process is carried out, the liquid is agitated or stirred constantly to form a frozen mass of snow and liquid resembling a water ice. This frozen liquid is then concentrated by removal of the snow crystals, this preferably being accomplished by a centrifugal machine 8 which throws out the liquid part of the infusion but which retains the snow.

The concentrated liquid is collected in a storage tank 9 and then filtered again while cold through filter 10 to remove any suspended matter which was thrown into suspension by the freezing and removal of the water. The liquid concentrate may be refrozen and again concentrated until the desired point of concentration is obtained and is then bottled or sealed in containers being kept in a storage receptacle 11. The bottled concentrate is then subjected to a sterilizing temperature of about 170° F. to form the final finished product.

The finished concentrate is suitable for use as cup coffee by dilution and is also suitable for use as a flavoring extract. As the undesirable elements are eliminated, it maintains its flavor and does not spoil or break down when standing.

The several steps in producing a coffee concentrate should be carried out as rapidly as possible. The coffee infusion as made in the centrifuge contains certain undesirable elements which lend to break down the liquid or destroy the flavor. The hot filtration removes a part of these undesirable elements but not all of them. The hot filtration and the intermediate cold filtration of the infused liquid may be omitted from the process without changing the result, but it has been found preferable to filter both hot and cold to remove as much of the matter in suspension as possible before concentrating.

The concentrating of the liquid must of course be carried out in a cold chamber. The freezing of the liquid into a water ice or snow is first done and then the resultant frozen mass is passed through a centrifuge which is kept at a low enough temperature to prevent melting of the snow and ice crystals. The concentrate containing oils is finally filtered to take out any matter thrown into suspension by the removal of the water and in this way it has been found possible to produce a concentrated coffee liquid containing oils which will keep indefinitely and maintain its coffee flavor. Its strength is such that a teaspoonful is sufficient to make a cup of coffee of usual strength. The yield per pound of coffee is increased over the best known urn methods.

Where two intermediate filtration steps are eliminated and the infused liquid merely cooled and concentrated, it should then be filtered cold and preferably in a step filter using two or more steps. Where the desired concentration can not be obtained by a single freezing, this method is very satisfactory as the liquid as the result of the first concentration may be filtered cold, sent back for final freezing and concentration and then bottled and sterilized to obtain the same final product.

To obtain a satisfactory filtration of the liquid, it has been found preferable to use a filter mass of cotton pulp and to use a step filter of two or more layers of filtering material.

It is of course understood that the infusion is made by passing hot water just below the boiling point through the coffee, and at no time until after final concentration and filtering is the liquid boiled or raised to a sterilizing temperature. Sterilization of final produce 170° F.

The apparauts must also be kept clean and where metal is employed, only such metals should be used as do not chemically react with the liquid to break down its flavor and where possible porcelain or glass should be employed.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of making a liquid coffee concentrate, containing oils, consisting of infusing ground coffee with water to obtain a coffee liquid, cooling and freezing such liquid into a snow form, removing the snow and ice crystals from the frozen mass, and filtering the obtained concentrate to remove all suspended matter.

2. The method of making a liquid coffee concentrate, containing oils, consisting of infusing ground coffee with water to obtain a coffee liquid, cooling and freezing such liquid into a snow form, removing the snow and ice crystals from the frozen mass, filtering the obtained concentrate to remove all suspended matter and sterilizing the filtered concentrate at a temperature below the boiling point of water.

3. The method of making a liquid coffee concentrate, containing oils, consisting of infusing ground coffee to obtain a liquid coffee, filtering such liquid coffee, cooling and freezing such infused liquid into a snow form, removing the water crystals from such frozen mass, and cold filtering the resultant concentrate.

4. The method of making a liquid coffee concentrate, containing oils, consisting of infusing ground coffee to obtain a liquid coffee, filtering such liquid while hot, cooling and freezing such infused liquid into a snow form, removing the water crystals from such frozen mass, by centrifuging the same to obtain the unfrozen concentrate, and filtering the resultant concentrate cold.

5. The method of making a liquid coffee concentrate, containing oils, consisting of infusing ground coffee to obtain a liquid coffee, cooling such liquid coffee to a temperature near the freezing point, filtering such cooled liquid coffee, freezing the filtered liquid into a snow or water ice, removing the snow and ice crystals of water, collecting the concentrated coffee liquid containing oils, and filtering such concentrate.

6. The method of making a liquid coffee concentrate, containing oils, consisting of infusing ground coffee with hot water to obtain a liquid coffee, filtering such infused hot liquid, cooling such filtered liquid to nearly the freezing point, filtering such cooled liquid, freezing such twice filtered liquid into a snowy mass, centrifuging such frozen liquid to remove the concentrate containing oils from the snow crystals, and filtering such obtained concentrate.

7. The method of making a liquid coffee concentrate, containing oils, consisting of infusing ground coffee with hot water to obtain a liquid coffee, filtering such infused hot liquid, cooling such filtered liquid to nearly the freezing point, filtering such cooled liquid, freezing such twice filtered liquid into a snowy mass, centrifuging such frozen liquid to remove the concentrate containing oils from the snow crystals, filtering such obtained concentrate, and sterilizing such filtered concentrate at about 170° F.

8. The method of making a liquid coffee concentrate, containing oils, consisting of infusing ground coffee with hot water to obtain a liquid coffee, filtering such infused hot liquid, cooling such filtered liquid to nearly the freezing point, filtering such cooled liquid, freezing such twice filtered liquid into a snowy mass, centrifuging such frozen liquid to remove the concentrate containing oils from the snow crystals, maintaining such frozen mass below melting temperature during centrifuging to prevent melting of the snow crystals, collecting and filtering such concentrate containing oils, and sterilizing such filtered concentrate.

9. The method of making a liquid coffee concentrate containing oils, consisting of infusing ground coffee with water to obtain a coffee liquid, cooling and freezing such liquid into a snow form, removing the snow and ice crystals from the frozen mass to concentrate the liquid, filtering such cold concentrate to remove the undesirable elements, and refreezing and concentrating to the desired concentration.

10. The method of making a liquid coffee concentrate containing oils, consisting of infusing ground coffee with water to obtain a coffee liquid, cooling and freezing such liquid into a snow form, removing the snow and ice crystals from the frozen mass to concentrate the liquid, filtering such cold concentrate to remove the undesirable elements, refreezing and concentrating to the desired concentration, and bottling and sterilizing the final concentrate.

Signed by me this 2nd day of July, 1924.

WALTER M. ZORN.